(12) United States Patent
Nass

(10) Patent No.: US 11,459,718 B2
(45) Date of Patent: Oct. 4, 2022

(54) PLIABLE ROCK SALT SHEET

(71) Applicant: Kenneth M. Nass, Ossining, NY (US)

(72) Inventor: Kenneth M. Nass, Ossining, NY (US)

(*) Notice: Subject to any disclaimer, the term of this patent is extended or adjusted under 35 U.S.C. 154(b) by 235 days.

(21) Appl. No.: 16/367,902

(22) Filed: Mar. 28, 2019

(65) Prior Publication Data

US 2019/0301121 A1    Oct. 3, 2019

Related U.S. Application Data

(60) Provisional application No. 62/649,043, filed on Mar. 28, 2018.

(51) Int. Cl.
*C09K 3/18* (2006.01)
*E01H 10/00* (2006.01)

(52) U.S. Cl.
CPC ............. *E01H 10/00* (2013.01); *C09K 3/185* (2013.01)

(58) Field of Classification Search
CPC ............ C09K 3/18; C09K 3/185; E01H 10/00
See application file for complete search history.

(56) References Cited

U.S. PATENT DOCUMENTS

| | | | |
|---|---|---|---|
| 2,497,998 A | 2/1950 | Lee et al. | |
| 4,355,074 A * | 10/1982 | Stemmler | C09J 7/20 428/350 |
| 4,967,057 A | 10/1990 | Bayless et al. | |
| 5,674,428 A | 10/1997 | Lott et al. | |
| 6,051,812 A | 4/2000 | Walker | |
| 6,278,085 B1 | 8/2001 | Abukasm | |
| 8,409,688 B2 | 4/2013 | Afolabi | |
| 8,790,764 B2 | 7/2014 | Mitchell | |
| 9,528,235 B1 | 12/2016 | Irving | |
| 2003/0054132 A1 | 3/2003 | Maupin | |
| 2003/0070578 A1 * | 4/2003 | Alger | E01C 7/356 106/13 |
| 2006/0289468 A1 | 12/2006 | Seibert et al. | |
| 2007/0131666 A1 | 6/2007 | Gregg et al. | |
| 2008/0272106 A1 | 11/2008 | Naylor | |
| 2010/0055360 A1 * | 3/2010 | Mitchell | D03D 25/00 428/34.1 |
| 2016/0100457 A1 | 4/2016 | Cole et al. | |
| 2016/0122254 A1 | 5/2016 | Welborn et al. | |
| 2017/0142779 A1 | 5/2017 | Mitchell | |
| 2017/0198183 A1 * | 7/2017 | Mello | B65D 65/46 |
| 2020/0165499 A1 * | 5/2020 | Lee | E01H 5/02 |

* cited by examiner

*Primary Examiner* — William P Watkins, III

(57) ABSTRACT

A device for melting snow includes a snow melting sheet formed of a plurality of particles of a snow and ice melting compound. The sheet is coated with a water-soluble adhesive coating applied to the particles of the snow and ice melting compound to bind the particles to form a sheet. After an area of ice and snow is melted with the sheet, the sheet simply dissolves. The sheets are presented in either a roll with perforations for tearing or a stack of connected or disconnected sheets.

20 Claims, 4 Drawing Sheets

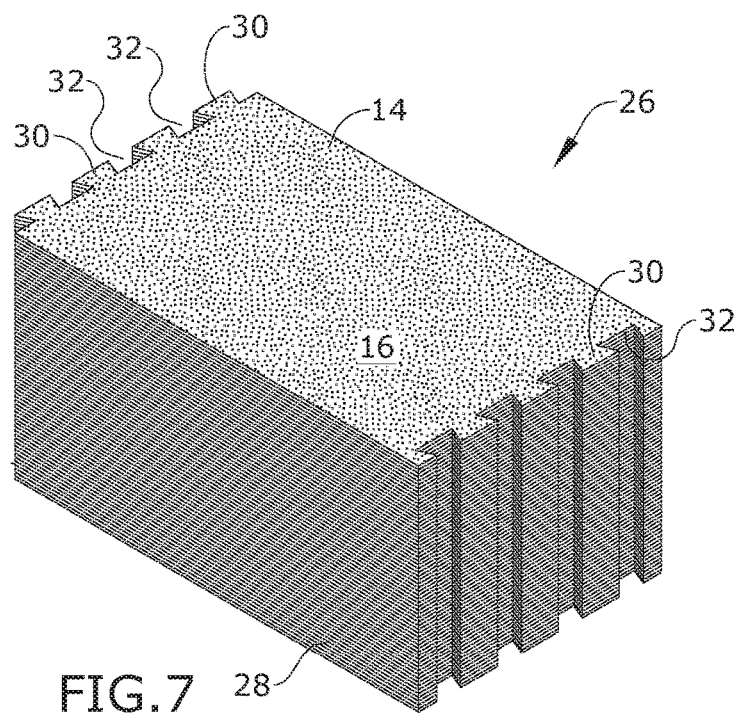
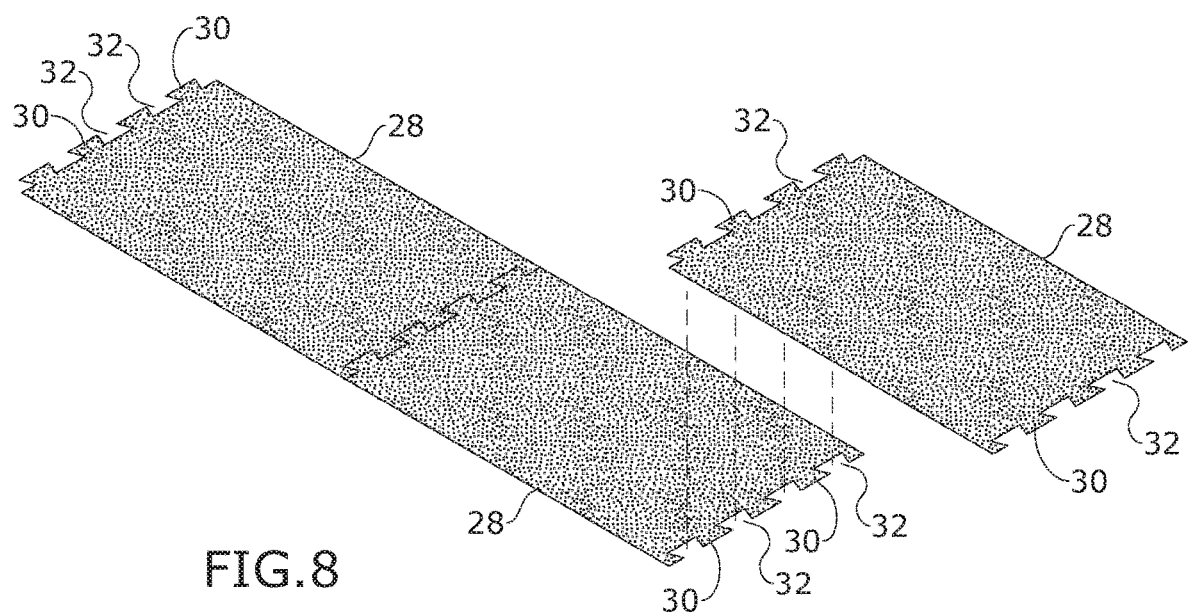

PLIABLE ROCK SALT SHEET

CROSS-REFERENCE TO RELATED APPLICATION

This application claims the benefit of priority of U.S. provisional application No. 62/649,043 filed on Mar. 28, 2018, the contents of which are herein incorporated by reference.

BACKGROUND OF THE INVENTION

The current invention relates to rock salt for melting snow, or more particularly, to a roll of pliable rock salt for melting snow.

Ice and snow often cause dangerous and slippery walking or running conditions on roads and walkways. Further, shoveling snow is one of the main causes of heart attacks in the United States. Rock salt may be spread on surfaces, but that still requires an individual to spend an extended amount of time in cold temperatures. Also, the rock salt is often spread out over walkways in a haphazard way and spots may be missed.

There exists a need for a convenient rock salt covering that completely covers the surface without the risk of missing spots and leaves no messy residue.

BRIEF DESCRIPTION OF DRAWINGS

FIG. 7 shows an alternate embodiment of the invention; and

FIG. 8 shows a perspective view of an alternate embodiment of the invention.

SUMMARY OF THE INVENTION

A device for melting ice and snow includes a plurality of particles of a snow and ice melting compound and a water-soluble adhesive coating applied to the particles of the snow and ice melting compound to bind the particles to form a sheet. The sheet is dissolvable.

In one embodiment, the snow and ice melting compound is rock salt. In one embodiment, the water-soluble adhesive coating is a water-soluble glue.

In one embodiment, the sheet includes perforations and is formed into a roll. In one embodiment, a plurality of sheets is stacked to form a stack of sheets. In one embodiment, the sheet includes interlocking ends on at least two edges of the sheet, where the interlocking ends are adapted to connect at least two sheets together.

A method of melting snow and ice includes the steps of placing an ice and snow melting sheet over an area of snow and ice. The ice and snow melting sheet includes a plurality of particles of a snow and ice melting compound and a water-soluble adhesive coating applied to the particles of the snow and ice melting compound to bind the particles to form the ice and snow melting sheet, where the ice and snow melting sheet is dissolvable. The next step includes allowing the snow and ice melting sheet to melt the area of snow and ice, the ice and snow melting sheet dissolving to reveal a path substantially clear of ice and snow.

In one embodiment, the method further includes tearing the ice and snow melting sheet at a perforation from a roll of a plurality of ice and snow melting sheets.

In one embodiment, the method includes removing the ice and snow melting sheet from a stack of a plurality of ice and snow melting sheets.

In one embodiment, the method includes placement of a plurality of ice and snow melting sheets over a plurality of areas of snow and ice.

DETAILED DESCRIPTION OF THE INVENTION

The following detailed description is of the best currently contemplated modes of carrying out exemplary embodiments of the invention. The description is not to be taken in a limiting sense but is made merely for illustrating the general principles of the invention, since the scope of the invention is best defined by the appended claims.

As stated above, snow and ice on surface often makes for treacherous walking or running conditions. The invention claimed here solves this problem.

Broadly, one embodiment of the present invention is a rock salt sheet which completely covers surfaces with a safe and fully dissolving method for melting ice/snow.

The claimed invention differs from what currently exists. Currently, rock salt is shaken or tossed onto sidewalks in a way that does not completely cover or melt all affected areas. Many areas of a walkway are left uncovered and unprotected from ice and snow. In one embodiment, the claimed invention rolls out to completely melt a continuous full walking path and dissolves completely, leaving no residue.

Figure 1:
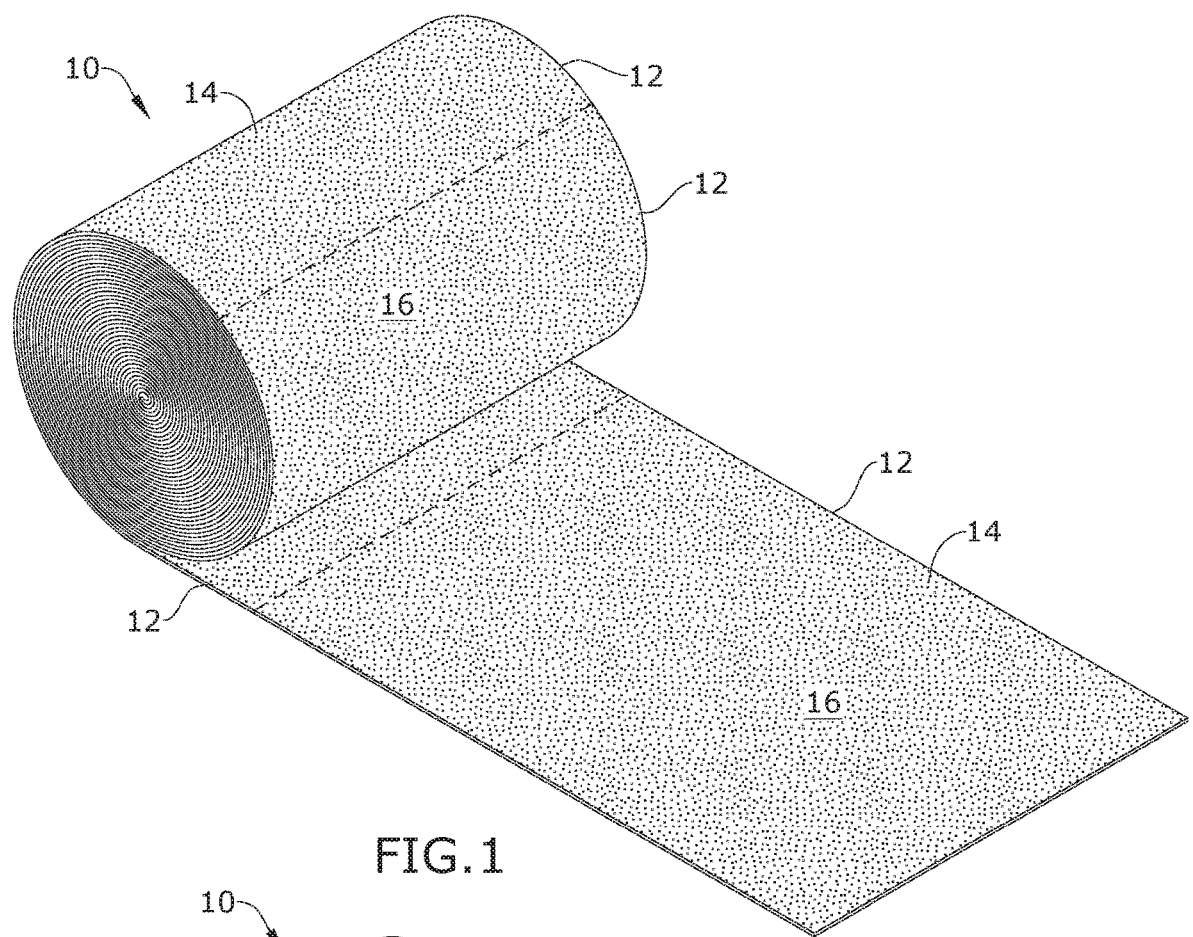
FIG. 1 shows one embodiment of a perspective view of the invention.

As shown in the embodiment of FIG. 1, the invention includes a perforated roll of dissolving-snow melting sheets 10. The perforated roll 10 includes a plurality of perforated dissolving snow-melting sheets 12. Each perforated sheet 12 is made of a snow/ice melting compound 14, which is held together with a water-soluble glue 16.

In one embodiment, the snow/ice melting compound 14 is a rock salt. In one embodiment, the perforated roll 10 is about 10'×20', with perforations about every 6 inches. It is to be understood, however, that the perforated roll 10 can be of any suitable length and width, and the perforations can be positioned along any suitable length of the perforated roll 10. In one embodiment, the sheets are ¼ inches thick, 2 feet wide, and 2 feet long. It is to be understood, however, that the sheets can be made in any desired sizes.

In one embodiment, the perforated roll 10 is rolled out in its entirety to create a path. For example, the perforated roll is simply unrolled onto the walkway or other surface. The needed length is torn at perforations on the roll 10.

Figure 2:
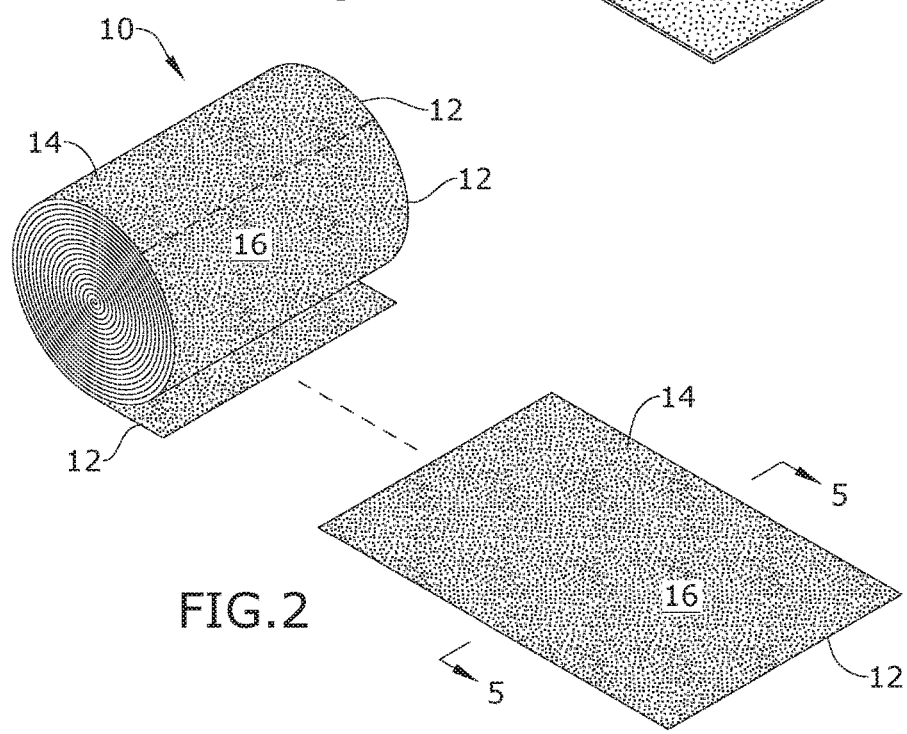
FIG. 2 shows one embodiment of a perspective view of the invention.
Figure 3A:
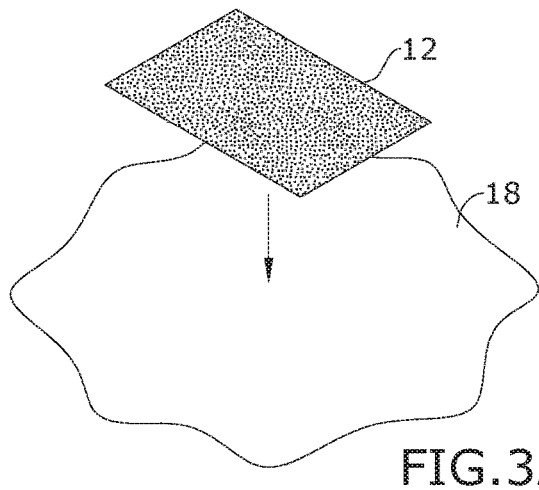
FIG. 3A shows one embodiment of a perspective view of the invention in use.
Figure 3B:
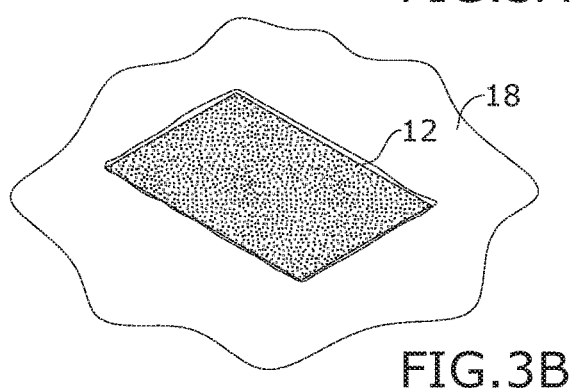
FIG. 3B shows one embodiment of a perspective view of the invention in use.
Figure 3C:
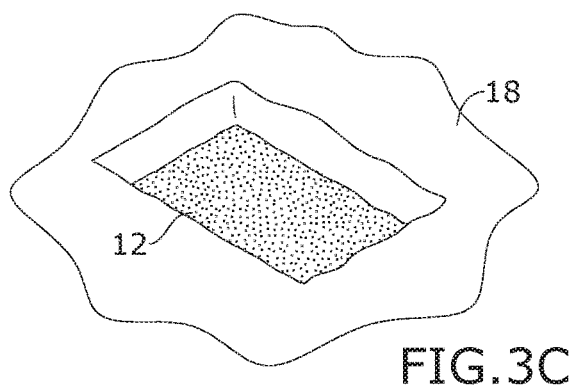
FIG. 3C shows one embodiment of a perspective view of the invention in use.
Figure 3D:
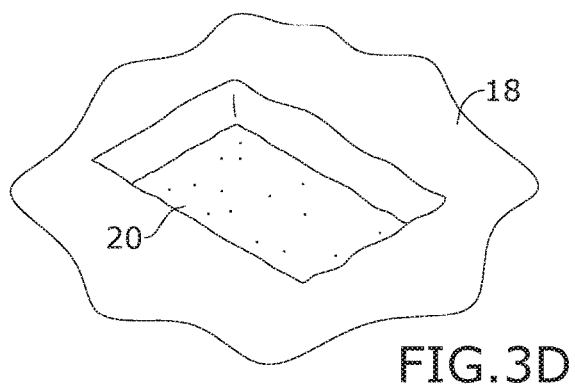
FIG. 3D shows one embodiment of perspective view of the invention after having dissolved.

In another embodiment as shown in FIG. 2, the roll 10 is separated at a perforation to separate the sheet 12. The embodiment of FIG. 3A shows a perspective view of the sheet 12 onto snow 18. The embodiment of FIG. 3B shows a perspective view of sheet 12 just after placement on snow 18. The embodiment of FIG. 3C shows a perspective view of sheet 12 after having melted snow 18. The embodiment of FIG. 3D shows a perspective view of sheet 12 after having simply dissolved to create a melted area 20 approximately the size of the sheet 12.

Figure 4:
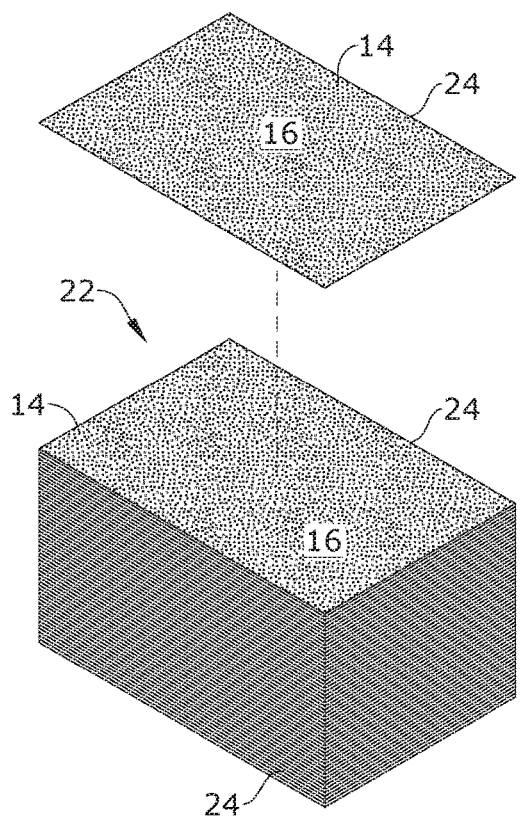
FIG. 4 shows one embodiment of a perspective view of an alternate embodiment of the invention.

FIG. 4 shows an alternative embodiment, wherein a plurality of single dissolving snow melting sheets of the compound 24 are placed in a stack 22. Each sheet 24 is simply removed from the stack 22 and used as needed.

Figure 5:
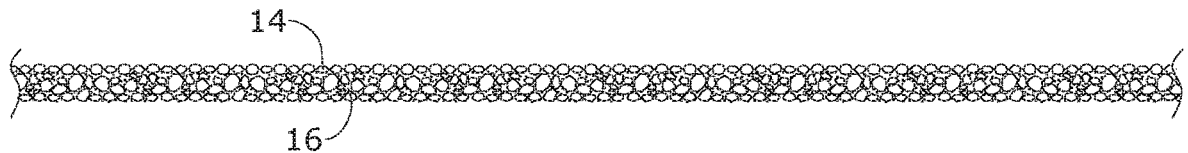
FIG. 5 shows a section view of the invention, taken along line 5-5 of FIG. 2.

FIG. 5 shows a section view of sheet 12 taken along 5-5 of FIG. 2. The sheet 12 includes the snow/ice melting compound 14 bound together with the water-soluble glue 16. It is to be understood that alternative embodiments may include other suitable adhesives or mechanisms of binding the compound 14 together.

Figure 6:
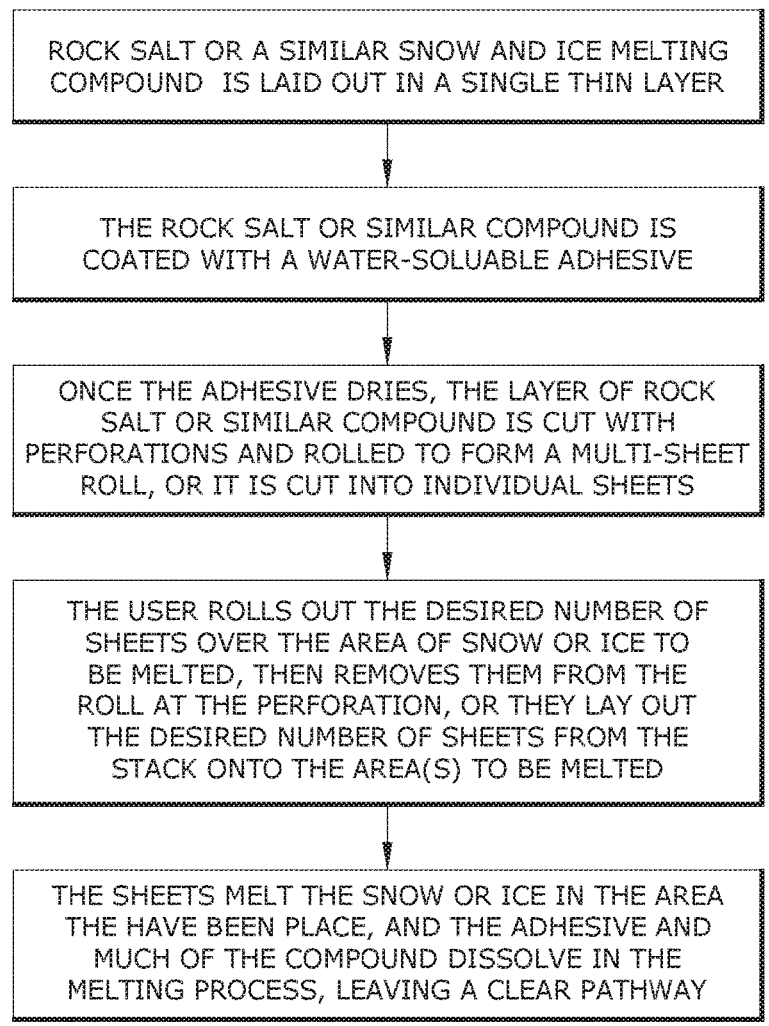
FIG. 6 shows one embodiment of a flow chart of the invention.

FIG. 6 shows one embodiment of a method of making and using the claimed invention. In one embodiment, rock salt or another suitable snow or ice melting compound is laid or spread out in a single layer. The melting compound is then coated with a suitable water-soluble adhesive. Once the adhesive dries, the layer of compound is either cut with perforations and rolled to form a multi-sheet roll or is cut into individual sheets. The sheets are either stacked or presented as needed. In alternative embodiments, the sheets may be cut into any suitable shape.

In one embodiment of the use, the user either rolls the entire sheet out, or uses individual sheets from a roll, stack, or just as a singular piece. The sheet(s) simply melt the snow or ice, leaving a clear pathway or space. Advantageously, the sheet simply dissolves, thus eliminating the need for the sheet to be removed.

FIGS. 7 and 8 show an alternative embodiment of the invention including a stack of interlocking sheets 26 made up of individual sheets 28. A plurality of interlocking sheets 28 are placed in the stack 26. Each interlocking sheet 28 includes interlocking tabs 30 and interlocking tab slots 32 on two ends. Advantageously, the sheet 28 can be interlocked with another sheet 28 on each end to create a longer path of ice melting sheets. The sheets 28 fit together, like a puzzle. Thus, a longer area, such as a sidewalk is covered, and the snow or ice melted.

In another embodiment, interlocking tabs 30 and slots 32 are on all four edges of the sheet 28 so that the sheets 28 are connected to create a wider and/or longer path. In another embodiment, the ice melting sheet of any of the disclosed embodiments is used in anticipation of snow and/or ice, such that it melts when it comes into contact with the sheet.

It should be understood, of course, that the foregoing relates to exemplary embodiments of the invention and that modifications may be made without departing from the spirit and scope of the invention as set forth in the following claims.

What is claimed is:

1. A device for melting ice and snow comprising:
   a plurality of particles of a snow and ice melting compound; and
   a water-soluble adhesive binding each particle of the plurality of particles of a snow and ice melting compound to an adjacent particle thereof in such a way as to form a sheet, the sheet being substantially dissolvable.

2. The device of claim 1, wherein the snow and ice melting compound is rock salt.

3. The device of claim 1, wherein the water-soluble adhesive is a water-soluble glue.

4. The device of claim 1, wherein the sheet includes perforations, the sheet with perforations formed into a roll.

5. The device of claim 1, wherein a plurality of sheets is stacked to form a stack of sheets.

6. The device of claim 1, wherein the sheet includes interlocking ends on at least two edges of the sheet, the interlocking ends adapted to connect at least two sheets together.

7. A method of melting snow and ice comprising:
   placing sheet over an area of snow and or ice, the sheet comprising:
      a plurality of particles of a snow and ice melting compound; and
      a water-soluble adhesive permeating said plurality of particles of the snow and ice melting compound so as to bind the particles of the plurality of particles of a snow and ice melting compound together to form a sheet thereof, the sheet being substantially dissolvable; and
   allowing the sheet to melt the area of snow and or ice, the sheet dissolving to reveal a path substantially clear of ice and snow.

8. The method of claim 7, further comprising tearing the ice and snow melting sheet at a perforation from a roll of a plurality of ice and snow melting sheets.

9. The method of claim 7, further comprising removing the ice and snow melting sheet from a stack of a plurality of ice and snow melting sheets.

10. The method of claim 7, further comprising placing a plurality of ice and snow melting sheets over a plurality of areas of snow and ice.

11. The method of claim 7, wherein the sheet is entirely dissolvable.

12. The method of claim 11, wherein the sheet is entirely dissolvable in water.

13. The method of claim 11, wherein the sheet is entirely dissolvable in snow.

14. The device for melting ice and snow of claim 1, wherein the sheet is entirely dissolvable.

15. The device for melting ice and snow of claim 14, wherein the sheet is entirely dissolvable in water.

16. The device for melting ice and snow of claim 14, wherein the sheet is entirely dissolvable in snow.

17. A device for melting ice and snow consisting of:
   a plurality of particles of a snow and ice melting compound; and a water-soluble adhesive coating applied to the particles of the snow and ice melting compound to bind the particles into a sheet.

18. The device for melting ice and snow of claim 17, wherein the sheet is substantially or entirely dissolvable.

19. The device of claim 1, wherein the plurality of particles of a snow and ice melting compound directly communicate with an external environment.

20. The method of claim 7, further comprising initially placing the sheet so that the plurality of particles of a snow and ice melting compound directly contact the snow and or ice.

* * * * *